Feb. 12, 1952  J. D. SCHWARTZ  2,585,857
ARTIFICIAL TOOTH
Filed March 9, 1948
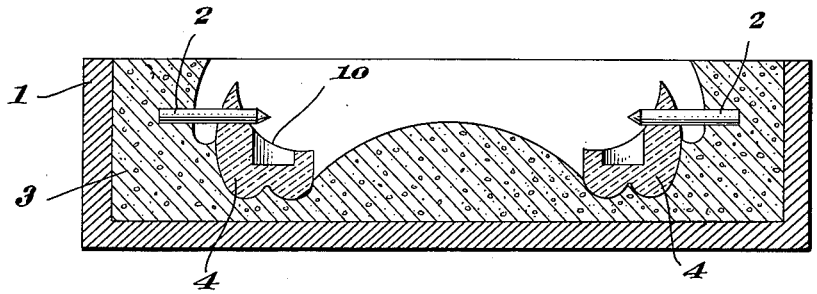
Fig. 1.
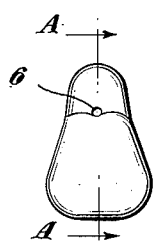 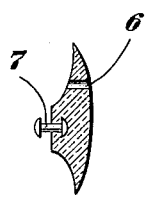 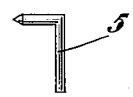
Fig. 2.  Fig. 3.  Fig. 4.
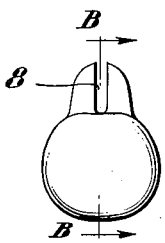 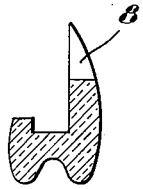 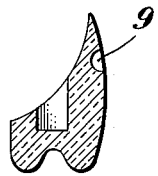
Fig. 5.  Fig. 6.  Fig. 7.
Inventor
Jacob D. Schwartz

Patented Feb. 12, 1952

2,585,857

UNITED STATES PATENT OFFICE 2,585,857

ARTIFICIAL TOOTH

Jacob D. Schwartz, Pittsburgh, Pa.

Application March 9, 1948, Serial No. 13,920

1 Claim. (Cl. 32—10)

This invention relates to new and useful improvements in artificial teeth which are used in making dentures having a plastic base, and has for its principal object provision of means for better retention of teeth in the investment material during the construction of a denture.

In making dentures, a cast of the jaw is first made by taking an impression thereof and filling the impression with a hard plaster. On this cast of the jaw is placed a layer of wax, called the wax base-plate, and into this wax base-plate are placed artificial teeth, which are arranged in position to meet the requirements of the particular patient for whom the denture is constructed.

The next step is called processing the denture, which consists of changing the wax replica of the denture to a more durable substance such as a plastic material. To accomplish this end, the waxed-up denture is placed in a metal flask and soft plaster of Paris, which in this case, is called the investment material, is poured around the teeth and wax model. When the soft plaster of Paris has set and become hard, the wax is melted out, leaving the artificial teeth imbedded in the investment plaster. The mold cavity formed by melting out the wax is filled with soft plastic material, and under heat and pressure is cured and hardened to form the finished denture.

When the wax is melted out of the flask, it is presumed that the investment plaster will grip the teeth and retain them in the exact relative position into which they were so laboriously and painstakingly placed in the wax base-plate. Unfortunately, this is not always the case. Due to the glassy surface and taper of the surfaces of the teeth, some teeth will manage to loosen from the investment plaster. There is then added work in cleaning the loose teeth and cementing them back into position in the investment plaster, and sometimes, because they are not accurately replaced, there is added work in the finished denture to correct the error.

If a flask such as is described in my patent, Number 2,432,820 is used, wherein the invested teeth are not quite so accessible or visible as in cases where standard flasks are used, it is quite difficult to know whether any teeth have worked loose from the investment plaster and if they have, it is equally difficult to replace them in their proper places.

It is therefore an object of this invention to provide an artificial tooth with an opening therein and a pin, one end of which is adapted to fit into the opening and the other end extending outwardly and beyond the tooth, adapted to be retained in the surrounding investment material, thereby forming an obstruction to prevent the invested tooth from being dislodged from its invested position. This and other objects will be more readily understood from the following description and drawing in which like reference characters in the several views represent the same thing and in which, Fig. 1. Is a cross-sectional view of a flask section having invested therein one part of a denture and in which the wax base plate has been removed and the retention pins are anchored in position.

Fig. 2. Is a labial view of an anterior tooth showing a retention opening.

Fig. 3. Is a cross-sectional view of Fig. 2 through the line A—A.

Fig. 4. Is a cross-sectional view of a bent retention pin.

Fig. 5. Is a buccal view of a posterior tooth showing a retention slot.

Fig. 6. Is a cross-sectional view of Fig. 5 through the line B—B.

Fig. 7. Is a cross-sectional view of a posterior tooth showing a retention recess.

As shown in the drawing, each tooth has an opening in one of its faces, such as 6 in Figures 2 and 3. I show three types of openings, they are 6 in Figures 2 and 3, 8 in Figures 5 and 6 and 9 in Figure 7. These three types of openings, as shown, are all located approximately at the gingival line on the labial and buccal surfaces, however, the openings may be placed on any other surface of the tooth, the least preferable surface being the ridge lap surface 10, because in the majority of cases it is difficult to reach. And the teeth may be anatomical or so called mechanical in shape.

In operation, the denture is waxed up in the usual manner. Following this operation, the retention openings, for example 6, in the teeth are exposed and opened by cutting way the small amount of wax covering them. After the opening is thus exposed, a pin 2 is placed therein with one end extending beyond the tooth 4 as shown in Figure 1. The wax, which was cut away to expose the opening is then replaced. The case is then invested in plaster of Paris 3 in a flask, a section 1 of which is shown, in the usual manner and when the investment material 3 has hardened, the free end of the pin 2 will be anchored therein. Obviously then, with one end of the pin anchored in the investment material and the other end disposed in the retention opening of the tooth, the tooth will not be dislodged from its invested position during the removal of the wax base or subsequent operations.

An alternate method may be used in which the pin is inserted into the retention opening of the tooth before the waxing operation is finished and while the openings are exposed and accessible. In this method I prefer to use a bent pin such as shown by 5, Figure 4, because the free end of the pin will be out of the way during the subsequent steps of finishing the waxing and contouring the gingival lines.

The type of retention opening 8 is indicated in short bite teeth where it would be difficult to provide an opening such as 6. Another form of retention opening is the small recess 9 in buccal or labial surface.

The retaining pin may be made of any rigid material, however, I prefer to use plastic pins having the same composition as the finished denture base, because in that case the pin will blend or fuse with the denture base material and will not be noticeable.

The metal pin shown by reference character 7, in the drawing is usually found in anterior teeth. It is used to hold the tooth to the denture base plate. As shown in the drawing, one end is permanently anchored in the tooth body and the other end extends outwardly, terminating in a knob to keep the tooth securely fastened to the base plate.

Having described the invention in one of its preferred forms, it being understood that variations thereof may be constructed without departing from the spirit of the invention, I claim:

In an artificial denture having a plastic base, the combination of an artificial tooth, comprising a tooth body being provided with an opening in a portion of said tooth body that is normally to be covered by said plastic base, said opening being adapted to receive one end of a rigid retaining pin in a manner that will leave the other end of said pin extending outwardly beyond said tooth body in a direction away from the denture base, to enable soft investment material to surround and anchor said other end of said retaining pin when the tooth is invested in investment material.

JACOB D. SCHWARTZ.

REFERENCES CITED

The following references are of record in the file of this patent:

UNITED STATES PATENTS

| Number | Name | Date |
|---|---|---|
| 482,377 | Moffitt | Sept. 13, 1892 |
| 1,040,571 | Osborn | Oct. 8, 1912 |
| 1,193,329 | Withycombe | Aug. 1, 1916 |
| 1,460,691 | Williams | July 3, 1923 |
| 2,107,181 | Guyton | Feb. 1, 1938 |

FOREIGN PATENTS

| Number | Country | Date |
|---|---|---|
| 588,490 | Great Britain | May 22, 1947 |